(12) United States Patent
Koczewski

(10) Patent No.: US 6,830,298 B2
(45) Date of Patent: Dec. 14, 2004

(54) ADJUSTMENT-LOCKING MECHANISM FOR AN AUTOMOBILE SEAT BACK

(75) Inventor: Zbigniew Koczewski, Rinteln (DE)

(73) Assignee: Faurecia Autositze GmbH & Co., Stadthagen (DE)

( * ) Notice: Subject to any disclaimer, the term of this patent is extended or adjusted under 35 U.S.C. 154(b) by 469 days.

(21) Appl. No.: 09/971,493

(22) Filed: Oct. 5, 2001

(65) Prior Publication Data

US 2003/0067201 A1 Apr. 10, 2003

Related U.S. Application Data

(63) Continuation of application No. PCT/EP01/01945, filed on Feb. 21, 2001.

(51) Int. Cl.⁷ .................................................. B60N 2/02
(52) U.S. Cl. ...................................................... 297/362
(58) Field of Search .............................. 297/361.1, 362; 16/354

(56) References Cited

U.S. PATENT DOCUMENTS

| 4,470,633 A | * | 9/1984 | Fourrey et al. | ............. 297/362 |
| 4,946,223 A | * | 8/1990 | Croft et al. | ................. 297/367 |

* cited by examiner

*Primary Examiner*—Milton Nelson, Jr.
(74) *Attorney, Agent, or Firm*—Bourgue & Associates

(57) ABSTRACT

A tilt adjustment-locking mechanism for a seat back includes a rotating locking mechanism part attached to the seat body and a fixed locking mechanism part that may tilt with the seat back which are connected together by a cam. The fixed locking mechanism part includes an interior-toothed area to which an exterior-toothed area of the rotating locking mechanism part forming a part of a tumbler drive fits. Clamping areas overlapping the fixed and rotating locking mechanism parts are provided. At least one of the locking mechanism parts includes a polygonal circumference area. These areas are engaged against numerous polygonal surfaces on the matching surfaces of the circumference area in the receptor opening on the seat back or the seat body so that it may not rotate, and whose exterior circumference is entirely surrounded by a clamping area.

11 Claims, 9 Drawing Sheets

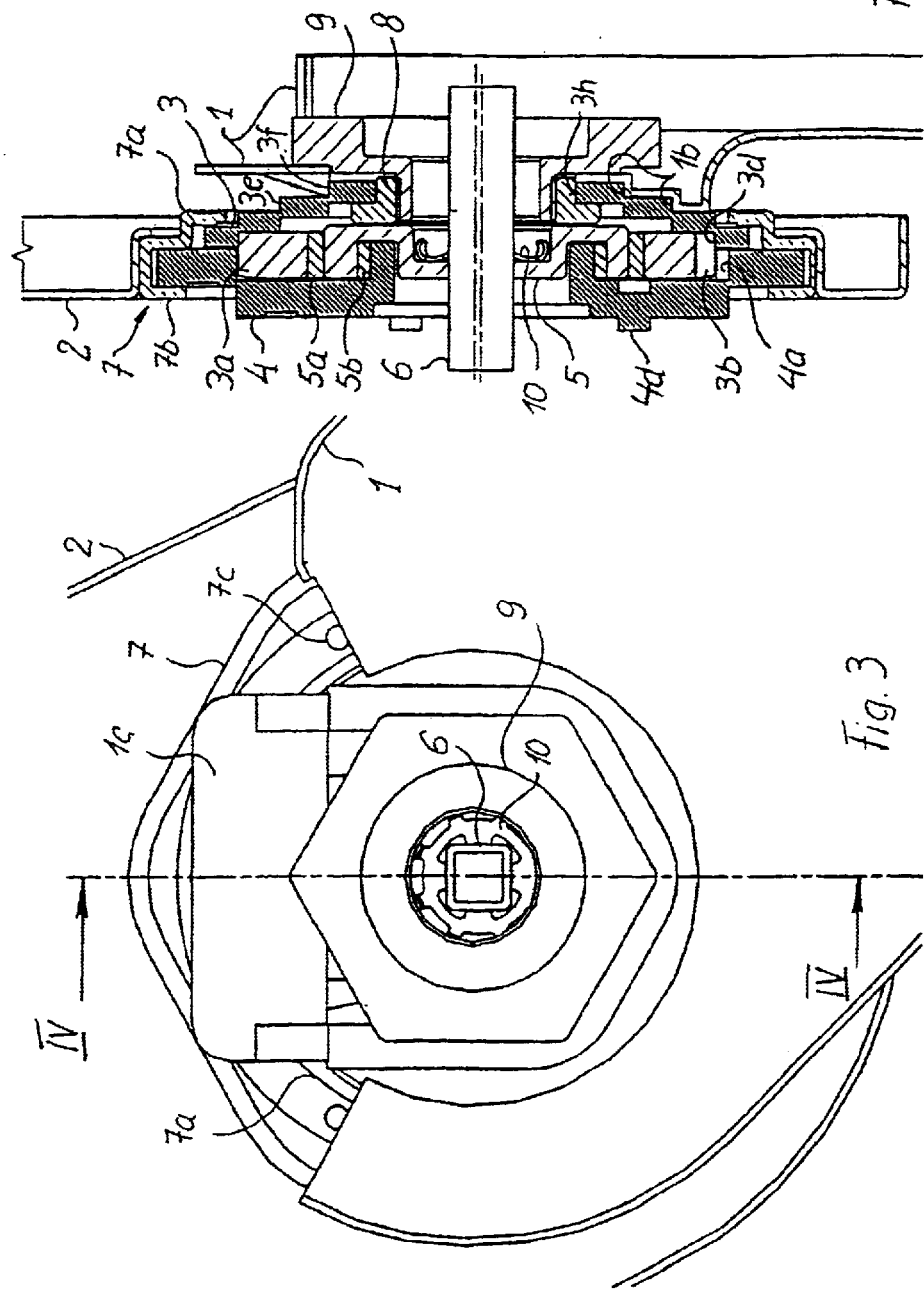

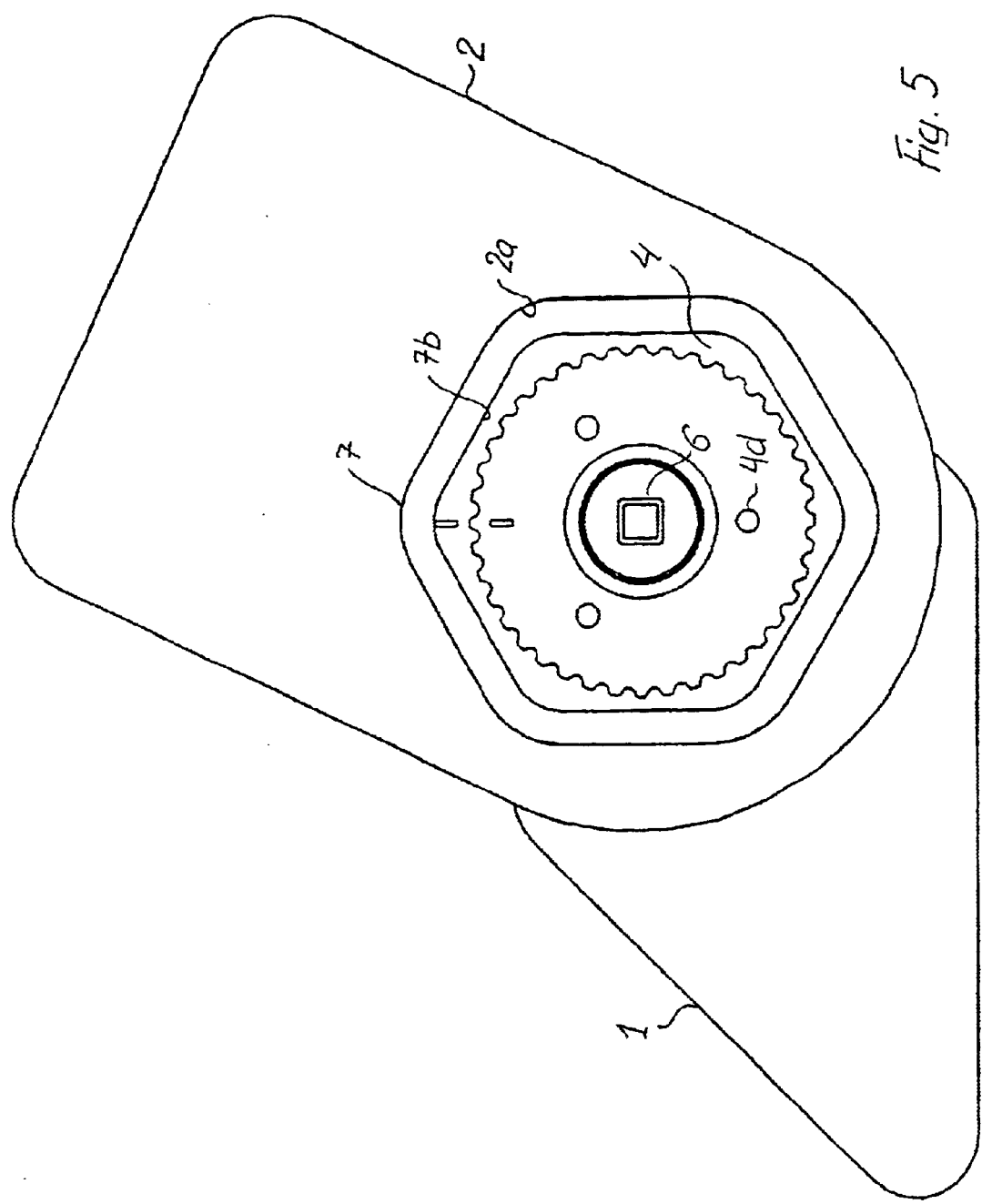

ADJUSTMENT-LOCKING MECHANISM FOR AN AUTOMOBILE SEAT BACK

CROSS-REFERENCE TO RELATED APPLICATIONS

This is a continuation of international application PCT/EP01/01945, filed 21 Feb. 2001, which designated the United States and is now abandoned.

FIELD OF THE INVENTION

BACKGROUND OF THE INVENTION

A tilt adjustment-locking mechanism for a seat back of the known type such as disclosed in DE 43 04 725 C2 includes two locking mechanism parts engaged together via the toothed areas of a tumbler drive whose flange areas are firmly connected to the seat back or seat body. Areas of the locking mechanism parts are gripped about their circumference by clamping areas that hold the locking mechanism parts opposite each other in order to accept the large axial forces or inertia that may arise during a crash. This protection from lateral loads is insufficient however. This design has already been improved upon in that an additional radially-deviating clamping area is provided during the tilt process. Even this additional clamping area can only partly solve the problem.

Another adjustment drive is known as described in DE 696 00 369 T2 whose opposing rotatable disks are held together by means of a clamping area that grips and encloses the outer circumference as a ring. One of the disks is welded to the seat body and the other disk is welded to the seat back. The welded connection can easily lead to displacement of the disks. Therefore, a similar design is not suitable for a tumbler drive providing a precise guide. Furthermore, the connection formed by this adjustment drive between the seat back and the seat body is permanent, so that the seat body and seat back may be upholstered and covered only as a unit.

SUMMARY OF THE INVENTION

Based on this state of the art, the invention has the task of forming a tilt adjustment-locking mechanism of a type so that the interlocking toothed areas remain engaged even when influenced by large forces. The solution of this task is provided by a tilt adjustment-locking mechanism for a seat back, comprising a fixed locking mechanism part; a rotating locking mechanism part; a rotatable cam, for connecting the fixed locking mechanism part connected to the rotating locking mechanism.

The fixed locking mechanism part includes an interior toothed area adapted to mate with an exterior-toothed area forming a part of the rotating locking mechanism part. At least one of the fixed and rotating locking mechanism parts includes a polygonal circumference area with polygonal surfaces that fit into correspondingly shaped first and second receptor openings disposed on the seat back or seat body.

The polygonal surfaces match with opposing surfaces without rotating. At least an exterior circumference of the fixed and rotating locking mechanism parts is overlapped by a clamping area on a clamping ring.

The tilt adjustment-locking mechanism based on the invention also provides protection against disengagement of the meshing toothed areas in the case of a crash. Advantageous embodiments of the invention arise from the claims and description of the present invention.

In one advantageous embodiment, the seat back is connected with the seat body so that they may be separated despite of the completely-surrounded circumferential clamping area, so that either part may be exchanged at any time. Welded joints may be excluded without reducing the strength of the connection. Even with a locking ring that surrounds both locking mechanism parts, the torque load-bearing ability is not reduced by means of its polygonal circumferential shape.

DESCRIPTION OF THE DRAWINGS

These and other features and advantages of the present invention will be better understood by reading the following detailed description, taken together with the drawings wherein:

FIG. 3 is an end view of the tilt adjustment-locking mechanism in FIG. 1;

FIG. 4 is a view taken along lines IV—IV in FIG. 3;

FIG. 5 is a side view of the tilt adjustment-locking mechanism in FIG. 1 seen from within;

DETAILED DESCRIPTION OF THE PREFERRED EMBODIMENT

In the case of an automobile seat, which will be used for exemplary purposes only and not a limitation of the present invention, a seat back is mounted on a seat body by means of a tilt adjustment-locking mechanism so that it may tilt. One tilt adjustment-locking mechanism (one a mirror image of the other) is mounted on each side of an automobile seat. Both tilt adjustment-locking mechanisms may be simultaneously adjusted by means of a multi-faced shaft 6.

Figure 7:
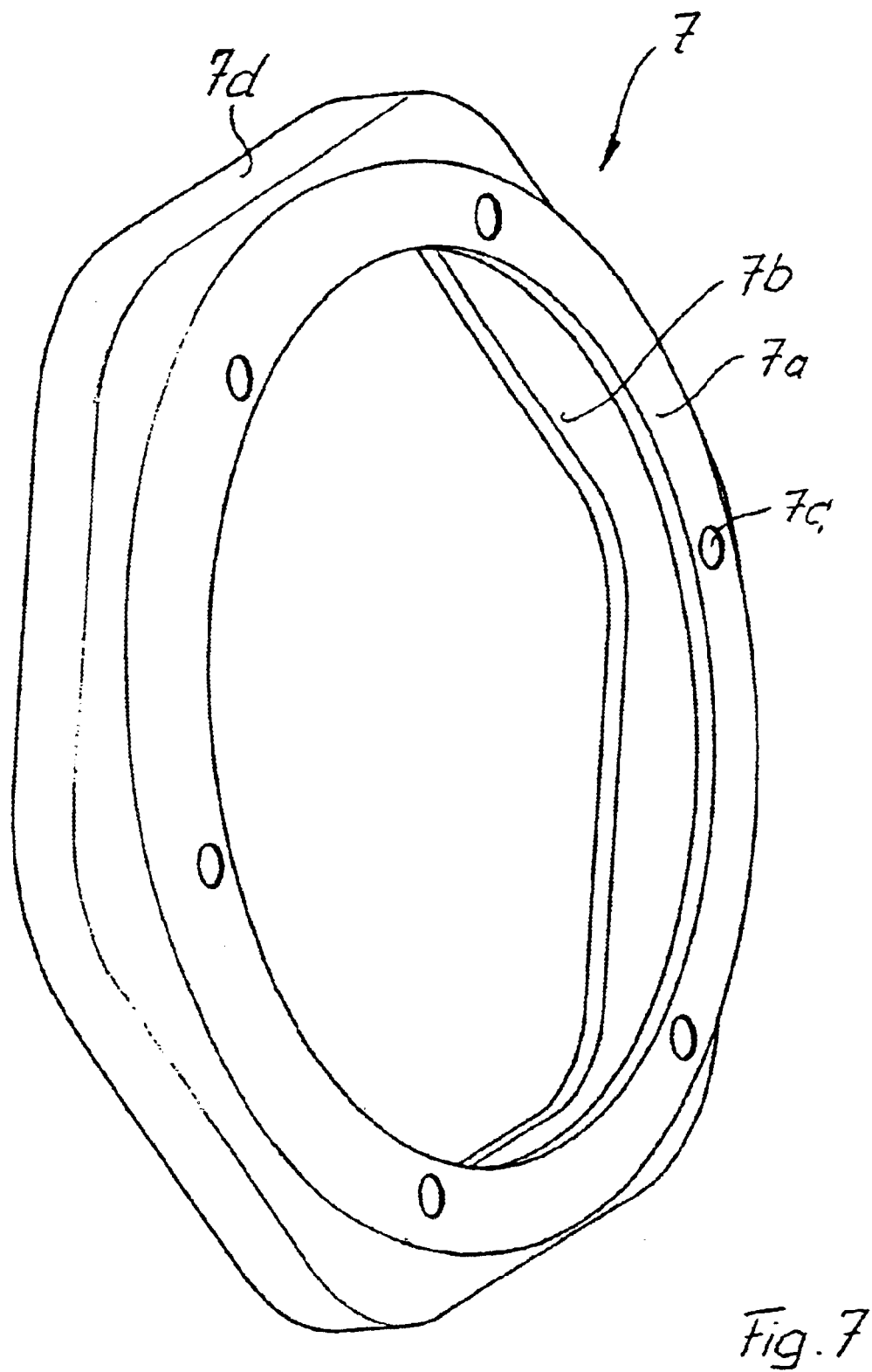
FIG. 7 is an enlarged scale drawing of a locking ring as shown in FIG. 1.
Figure 8:
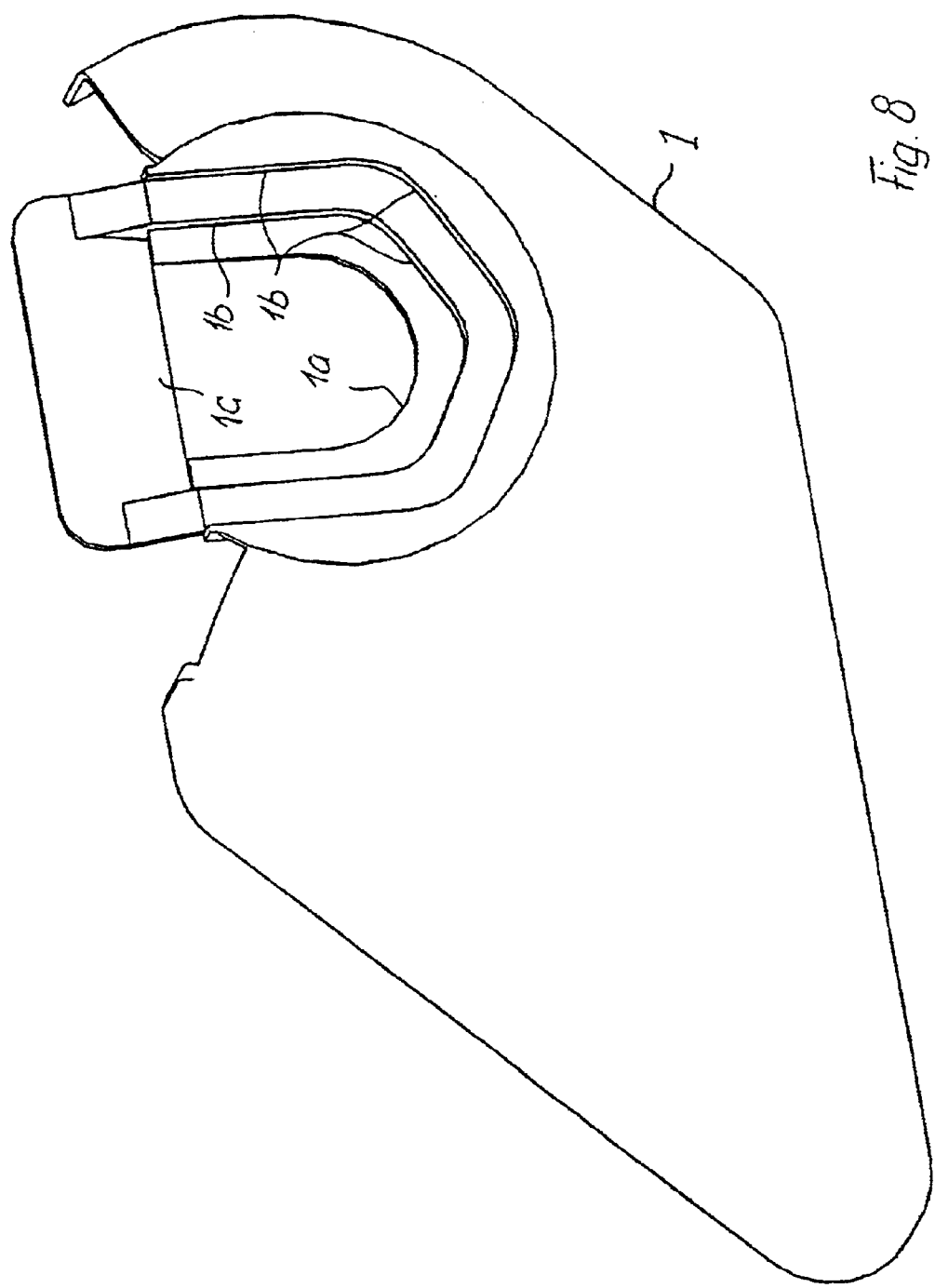
FIG. 8 is an enlarged scale drawing of a flange for affixing to a seat body.
Figure 9:
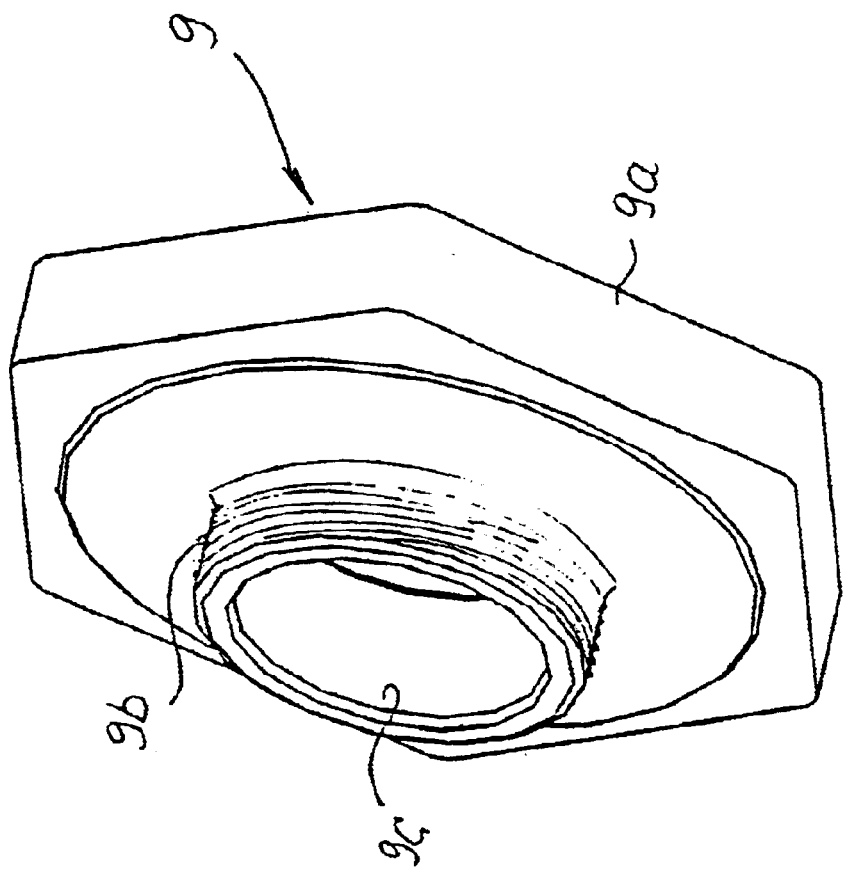
FIG. 9 is an enlarged scale drawing of the thread ring of FIG. 1.

A flange 2 is attached to the seat back that includes a polygonal, closed receptor opening 2a. A locking ring 7 is mounted in the receptor opening 2a so that it is fixed axially. The locking ring 7 includes a circumference area 7d (FIG. 7) matching the receptor opening 2a.

The locking ring 7 rests with the outer surfaces of its polygonal circumference area 7d on matching surfaces 2b of the receptor opening 2a with no play. Ring-shaped clamping areas 7a and 7b pointing inward are connected to the circumference area 7d.

Two locking mechanism parts 3 and 4 are inserted into the locking ring 7 from which a first locking mechanism part 4 possesses an outer shape that fits without radial play into the locking ring 7. The first locking mechanism part 4 is supported by the polygon surfaces 4c at the circumference area 4b in the locking ring 7 and in the receptor opening 2a so that it may not rotate, and is thus firmly affixed to the seat back. Several passages toward the seat inner side are provided for riveted brakes (not shown) on the locking mechanism part 4 affixed to the seat back.

The second locking mechanism part 3 includes a round cylindrical outer circumference 3c, and is held in the locking ring 7 so that it may rotate. After the locking mechanism parts 3 and 4 are inserted, the locking ring 7 may be closed by rolling the clamping area 7b inwards around the circumference 4b. The cross-section of the locking ring 7 has basically a U-shape. Axial play between the locking mechanism parts 3 and 4 is prevented by pressed projections 7c in the clamping area 7a.

Figure 6:
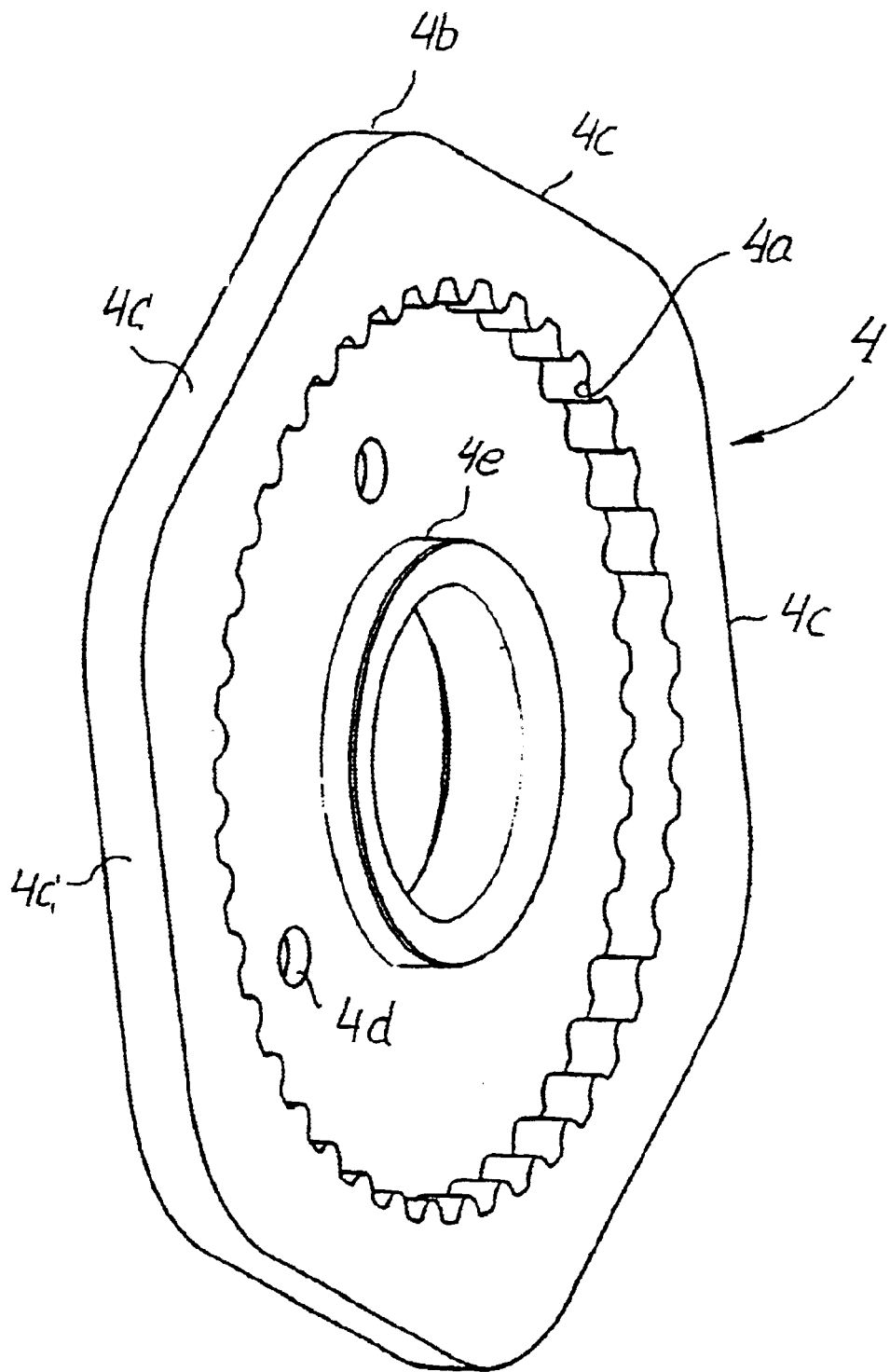
FIG. 6 is an enlarged scale drawing of a tilt adjustment-locking mechanism with interior teeth as shown in FIG. 1.

The locking mechanism part 4 attached to the seat back as shown in FIG. 6 possesses a hub 4e that is surrounded by a support bushing 5b onto which a cam 5 is mounted so that it may rotate. The cam 5 is penetrated in a form-locking manner by the multi-faced shaft 6 that is held by a spring disk 10 in the cam 5 that cannot move axially. An additional support bushing 5a that supports a toothed ring 3a is located on the outer circumference of the cam 5. The externally-toothed area 3b of the toothed ring 3a meshes with an internally-toothed area 4a provided on the first locking mechanism part 4. The internally-toothed area 4a includes at least one more tooth than the externally-toothed area 3b and, as FIG. 4 shows, a head diameter size larger than externally-toothed area 3b by the amount equal to the tooth height.

Figure 1:
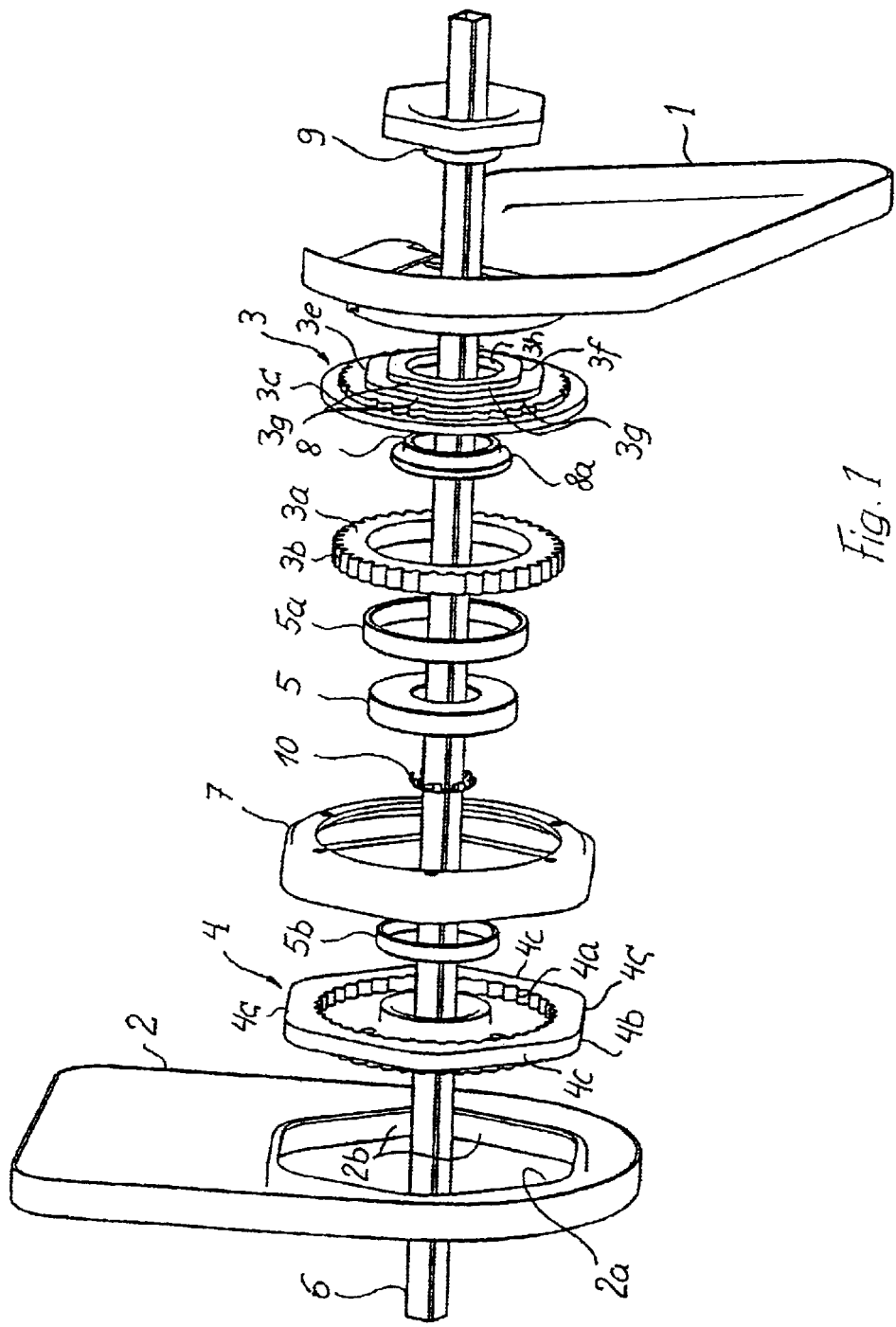
FIG. 1 is an exploded view of a tilt adjustment-locking mechanism according to the present invention as seen from the exterior of the seat.
Figure 2:
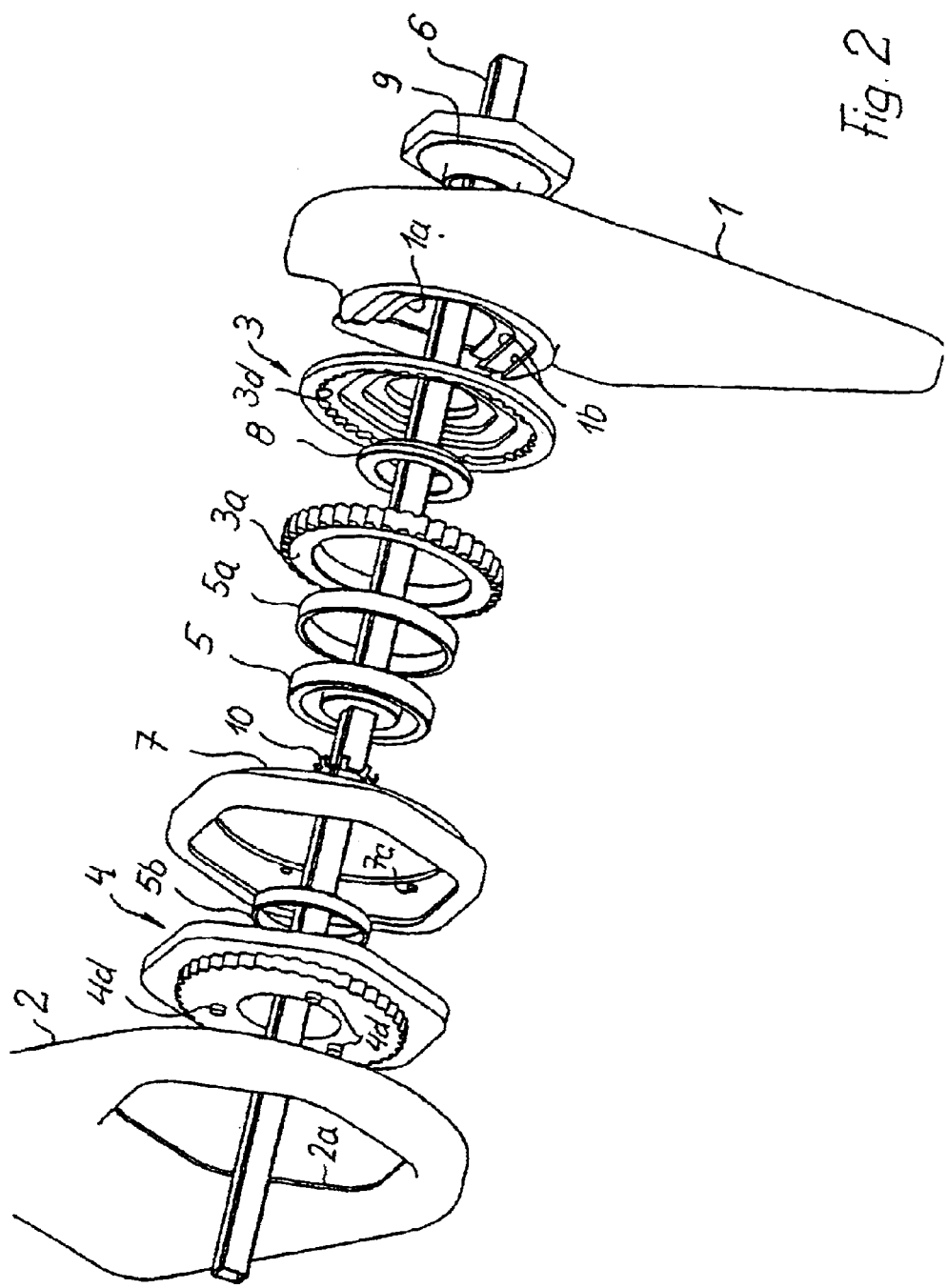
FIG. 2 is an exploded view of the tilt adjustment-locking mechanism in FIG. 1 as seen from the interior of the seat.

The toothed ring 3a projects axially above the locking mechanism part 4. The toothed ring 3a is pressed into an internally-toothed passage 3d with the overlapping area of the externally-toothed area 3b visible in FIG. 2. Two additional passages with polygonal circumference areas 3e and 3f are pressed into the second locking mechanism part 3 that are shaped as polygons of differing sizes with polygon surfaces 3g. Several of the polygon surfaces 3g rest against matching surfaces 1b of the flange 1 attached to the seat body that surround a receptor opening 1a.

The receptor opening 1a is enclosed by a crosspiece 1c. The polygon surfaces 3g and the matching surfaces 1b prevent the second locking mechanism part 3 from rotating against the flange 1 attached to the seat body.

The locking mechanism part 3 is held in the axial direction against the flange 1 by a threaded bushing with a shoulder 8a that penetrates a central hole 3h of the locking mechanism part 3, and into whose interior threads a thread ring 9 with an exterior thread 9b is screwed. The thread ring 9 is rotated by means of a six-sided fitting 9a. It includes an access opening 9c for the multi-faced shaft 6.

After the multi-faced shaft 6 is extracted, the locking mechanism part 3 may be removed from its receptor opening 1a by loosening the thread ring 9 at any time. The seat back may then be removed from the seat body together with the locking mechanism parts 3 and 4 held together by means of the flange 2 via the locking ring 7.

Figure 11:
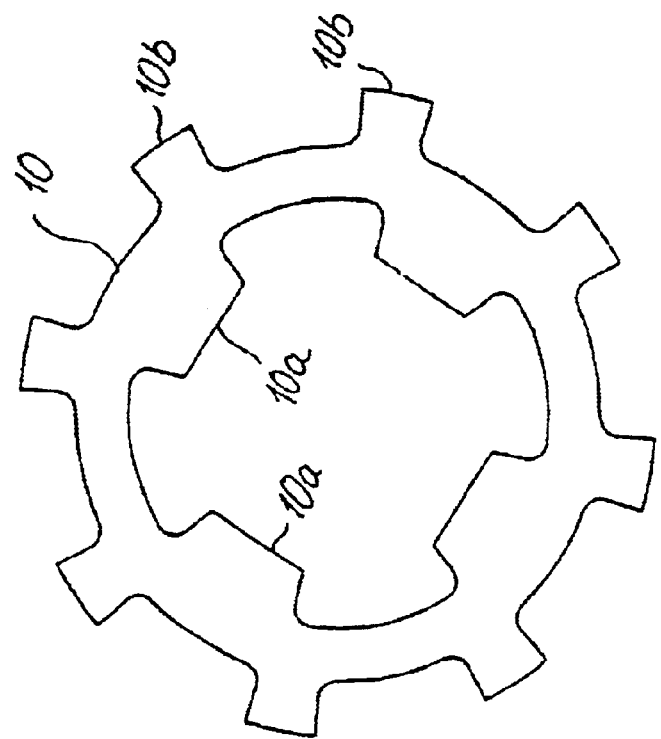
FIG. 11 is a front view of the spring disk of FIG. 10.
Figure 10:
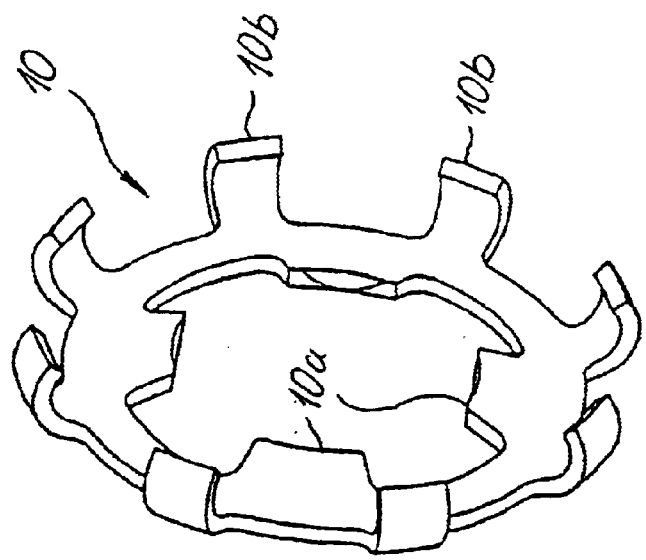
FIG. 10 is an enlarged perspective scale drawing of the spring disk of FIG. 1.

As FIGS. 4, 10, and 11 particularly show, the multi-faced shaft 6 is held in the cam 5 by the clamp jaws 10a on the spring disk 10 so that it may not move axially. The clamp jaws 10a open when forced onto the multi-faced shaft 6 and clamp on it. The spring disk 10 also possesses spring fingers 10b distributed about the circumference that rest against a surrounding interior wall of the cam 5 under tension.

A rotation of the multi-faced shaft 6 with the cam 5 held against it so that it may not rotate leads to a hopping motion of the exterior-toothed area 3b of the toothed ring 3a on the interior-toothed area 4a of the locking mechanism part 4. The locking mechanism part 4 is displaced toward the circumference with respect to the locking mechanism part 3 connected permanently to the seat body because of the different number of teeth. The seat back with flange 2 is tilted by an angle determined by the tooth distribution and the differing number of teeth with each rotation of the multi-faced shaft 6.

Modifications and substitutions by one of ordinary skill in the art are considered to be within the scope of the present invention that is not to be limited except by the claims which follow.

What is claimed is:

1. A tilt adjustment-locking mechanism for a seat back, comprising:

a fixed locking mechanism part;

a rotating locking mechanism part;

a rotatable cam, for connecting said fixed locking mechanism part to said rotating locking mechanism;

said fixed locking mechanism part including an interior-toothed area adapted to mate with an exterior-toothed area forming a part of said rotating locking mechanism part;

wherein at least one of said fixed and rotating locking mechanism parts includes a polygonal circumference area with polygonal surfaces that fit into correspondingly shaped first and second receptor openings disposed on the seat back or a seat body, said polygonal surfaces matching opposing surfaces without rotating, wherein at least an exterior circumference of said fixed and rotating locking mechanism parts is overlapped by a clamping area on a clamping ring.

2. The tilt adjustment-locking mechanism for a seat back of claim 1, wherein at least one of said two receptor openings is shaped to be enclosed all around.

3. The tilt adjustment-locking mechanism for a seat back of claim 1, wherein the clamping ring is polygonally-shaped and the clamping areas are disposed thereon and wherein the clamping ring overlaps the exterior circumference of the fixed and the rotating locking mechanism parts.

4. The tilt adjustment-locking mechanism for a seat back of claim 3, wherein the clamping ring has an approximately U-shaped cross section.

5. The tilt adjustment-locking mechanism for a seat back of claim 3, wherein the clamping ring includes pressed projections in one clamping area projecting axially, that remove play.

6. The tilt adjustment-locking mechanism for a seat back of claim 1, wherein the clamping ring that is provided to overlap at least an exterior circumference of said fixed and rotating locking mechanism parts includes rolled first and second clamping areas.

7. The tilt adjustment-locking mechanism for a seat back of claim 1, wherein at least one of said fixed and rotating locking mechanism parts fitting into a polygonal receptor opening is axially adapted to be threaded together with the seat back or seat body that includes the receptor opening.

8. The tilt adjustment-locking mechanism for a seat back of claim 1, wherein the rotating locking mechanism part is penetrated centrally by a threaded bushing which includes a shoulder that is adapted to be threaded together with a threaded ring that fits into the rotating locking mechanism part for the seat back or seat body that includes the receptor opening.

9. The tilt adjustment-locking mechanism for a seat back of claim 8, wherein the threaded ring and the threaded bushing are penetrated by a multi-faced shaft on which the cam is mounted so that it may not rotate.

10. The tilt adjustment-locking mechanism for a seat back of claim 1, wherein the rotating locking mechanism part that includes an exterior-toothed area also includes an interior-toothed passage into which a toothed ring is pressed, and whose exterior-toothed area engages the interior-toothed area of the fixed locking mechanism part.

11. The tilt adjustment-locking mechanism for a seat back of claim 1, wherein said rotating locking mechanism part includes several portions having polygonal-shaped circumference areas that may be inserted into the matching receptor opening so that it may not rotate.

* * * * *